United States Patent
Ohno

[19]

[11] Patent Number: 6,040,949
[45] Date of Patent: Mar. 21, 2000

[54] SIMPLE WIDE-ANGLE ZOOM LENS

[75] Inventor: Kazunori Ohno, Omiya, Japan

[73] Assignee: Fuji Photo Optical Co., Ltd., Omiya, Japan

[21] Appl. No.: 09/249,159

[22] Filed: Feb. 12, 1999

[30] Foreign Application Priority Data

Feb. 19, 1998 [JP] Japan ................................. 10-054387

[51] Int. Cl.[7] ................................................ G02B 15/14
[52] U.S. Cl. ...................................... 359/689; 359/682
[58] Field of Search .......................... 359/689, 687, 359/686, 682

[56] References Cited

U.S. PATENT DOCUMENTS

| | | |
|---|---|---|
| 4,018,510 | 4/1977 | Bertele . |
| 4,170,402 | 10/1979 | Nakagawa . |
| 4,380,376 | 4/1983 | Suda ........................................ 350/427 |
| 4,828,372 | 5/1989 | Betensky et al. . |
| 4,854,680 | 8/1989 | Kikuchi . |
| 5,015,077 | 5/1991 | Ueda . |
| 5,157,550 | 10/1992 | Tsuchida et al. . |
| 5,381,265 | 1/1995 | Ohshita . |

FOREIGN PATENT DOCUMENTS

| | | |
|---|---|---|
| 6-201993 | 7/1994 | Japan . |
| 7-113956 | 5/1995 | Japan . |
| 9-179026 | 7/1997 | Japan . |

*Primary Examiner*—Georgia Epps
*Assistant Examiner*—Michael A Lucas
*Attorney, Agent, or Firm*—Arnold International; Bruce Y. Arnold

[57] ABSTRACT

A wide-angle zoom lens of simple construction, having only four lens elements and three lens groups is disclosed. The refractive power of the lens groups is, in order from the object side, negative, positive and positive. An aperture stop 1 is arranged between the first lens group $G_1$ and the second lens group $G_2$. The lens is intended for use in a compact electronic still camera having a small overall length as well as a small lens diameter. When zooming, the position of the second lens group and the third lens group is varied along the optical axis. Predetermined conditions are satisfied in order to obtain a compact zoom lens having high optical performance over the entire range of zoom.

20 Claims, 12 Drawing Sheets

SIMPLE WIDE-ANGLE ZOOM LENS

BACKGROUND OF THE INVENTION

In recent years, advancements in electronic imaging technology have been remarkable. More specifically, more compact electronic still cameras with higher picture quality have been realized. Additionally, with the recent arrival of the electronic information age, the likelihood of electronic still cameras becoming widely used is excellent.

However, electronic still cameras are still expensive for their performance as compared with conventional photographic cameras that use silver chloride film, and this has been an obstacle to the wider popularity of electronic still cameras. Thus, there is strong need for a low cost, wide-angle zoom lens that is particularly suitable for use in electronic still cameras.

However, there have been many wide-angle zoom lenses designed heretofore. For example, Japanese Laid-Open Patent Application HO7-113956 discloses a two group, wide-angle zoom lens having, in order from the object side, a negative first lens group and a positive second lens group. This wide-angle zoom lens requires at least seven lens elements. Also, a comparatively wide-angle, four-group zoom lens is disclosed in Japanese Laid-Open Patent Application HO9-179026. This zoom lens is composed of, in order from the object side, a negative first lens group, a positive second lens group, a negative third lens group and a positive fourth lens group. This zoom lens also has at least seven lens element. It would be inaccurate to describe these conventional wide-angle zoom lenses as compact and inexpensive. Thus, development of a high performance, compact and inexpensive, wide-angle zoom lens specifically suited to an electronic still camera is desire.

Japanese Laid-Open Patent Application HO6-201993 descloses a two focal point lens that has a wide-angle position. This lens includes at least eight lens elements, with a diameter of the front lens group being comparatively large. Thus, the disclosed lens therein does not satisfy the need for a compact and inexpensive, wide-angle zoom lens suitable for use in an electronic still camera.

As is evident from these conventional examples, in order to obtain a compact zoom lens having high performance that is composed of only a few lens elements, a wide-angle zoom lens with a short focal length relative to the image size is desired. However, there is the problem in that, as the outer diameter of the lens increases in size at the wide-angle end where the image angle of the zoom lens increases, the lens barrel diameter must also increase and compactness is lost.

BRIEF SUMMARY OF THE INVENTION

The present invention relates to a simple wide-angle zoom lens that is used as a television lens and a photographic lens, and more specifically, it relates to a wide-angle lens of a simple construction (i.e., having few lens elements) suitable for an electronic still camera. A first object of the present invention is to provide a high performance wide-angle zoom lens which uses lens elements having small diameters throughout the zoom lens, including the front lens group. A second object of the invention is to reduce the number of lens elements needed, thereby reducing production costs. A third object of the invention is to reduce the overall length of the zoom lens, which, when combined with the first object of the invention, achieves a compact zoom lens.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

The simple wide-angle zoom lens of the present invention comprises, in order from the object side, a first lens group having negative refractive power, a second lens group having positive refractive power, and a third lens group having positive refractive power. When zooming, the second lens group and third lens group move along the optical axis. The first lens group is composed of a negative lens element having a concave surface on the image side, and the second lens group is composed of a bi-covex lens element. In addition, the construction is such so as to satisfy the following Conditions (1) and (2).

$$-3.0 < f_1/f_w < -2.0 \qquad \text{Condition (1)}$$

$$2.5 < f_2/f_w < 4.0 \qquad \text{Condition (2)}$$

where $f_1$ is the focal length of the first lens group, $f_w$ is the focal length of the wide-angle zoom lens at the wide-angle end, and $f_2$ is the focal length of the second lens group.

It is preferred that the simple wide-angle lens be constructed so as to also satisfy the following Conditions (3) and (4) and that an aperture stop be provided, at a fixed position relative to the image, on the image-side of the first lens group.

$$1.9 < D_e/f_w < 3.3 \qquad \text{Condition (3)}$$

$$3.8 < D_{2w}/f_w < 7.7 \qquad \text{Condition (4)}$$

where $f_w$ is as defined above, $D_e$ is the distance on the optical axis from the surface at the extreme image side of the first lens group (i.e., in FIGS. 1, 5 and 9, the lens surface having radius of curvature $R_2$) to the aperture stop, $D_{2w}$ is the spacing between the first lens group and the second lens group at the wide-angle end.

Moreover, it is preferred that the first lens group consists of a single lens element that has negative power with a concave surface on the image side, and at least one surface of this lens element be an aspherical surface.

Also, it is preferred that the second lens group consists of a single lens element, and that this lens element be a biconvex lens having at least one aspherical surface.

Further, the first lens group and the second lens group may each include at least one lens element made form an organic material.

In addition, the third lens group may consist of two lens elements that are cemented together.

Figure 1:
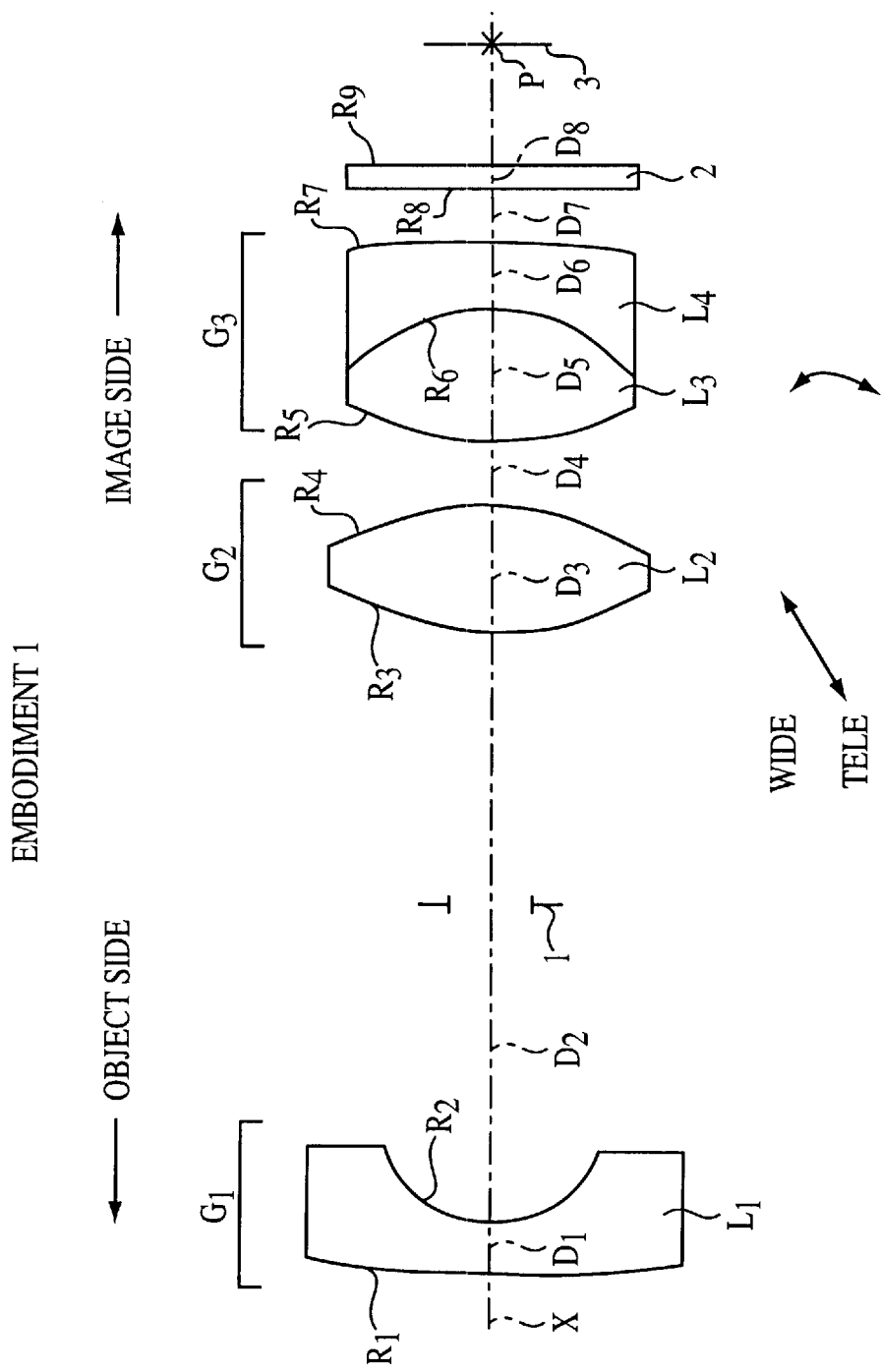
FIG. 1 illustrates the basic lens element construction of the wide-angle zoom lens of Embodiment 1.

The present invention will now be described with reference to the figures. FIG. 1 shows the basic lens element construction of the simple wide-angle zoom lens of Embodiment 1, indicating the lens group positions at the wide-angle end. As is shown in FIG. 1, the simple wide-angle zoom lens of the present embodiment includes, in order from the object side, a first lens group $G_1$ having negative refractive power, a second lens group $G_2$ having positive refractive power, and a third lens group $G_3$ having positive refractive power. An aperture stop 1 is arranged at a fixed position relative to the image surface and is located between the first lens group $G_1$ and the second lens group $G_2$.

The first lens group $G_1$ has a single lens element $L_1$, which is a negative meniscus lens with its convex surface on the object side. The second lens group $G_2$ has a single lens element $L_2$, which is a bi-convex lens with different radii of curvature on its opposite sides, with the surface having the greater curvature (i.e., the smaller radius of curvature) on the image side. The third lens group $G_3$ is formed of a third lens element $L_3$ that is cemented to a fourth lens element $L_4$. The third lens element $L_3$ is bi-convex lens having different radii of curvature on its opposite sides, with the surface of greater curvature on the image side, and the fourth lens element $L_4$ is a negative meniscus lens with its convex surface of the image side.

The luminous flux that passes through the aperture stop 1 is incident on the second lens group $G_2$ and the third lens group $G_3$ and an image is then formed on a surface 3 of the solid-state image sensor (CCD) through a filter component 2 that is positioned on the image-side of the third lens group $G_3$.

Moreover, as is shown in FIG. 1, when the focal length is changed from the wide-angle end to the telephoto end, the second lens group $G_2$ moves along the optical axis from the image side to the object side. Meanwhile, the third lens group $G_3$ moves first towards the image side and then towards the object side (as shown by the double-headed, curved arrows forming a surface convex toward the image-side in FIGS. 1, 5 and 9, respectively) so as to maintain a fixed image surface at surface 3 during zooming. The first lens group $G_1$ is fixed in relation to this fixed image surface.

By constructing the zoom lens as described above, the lens element diameters of all the lens elements can be held small, including the lens element diameter(s) of the first lens group $G_1$, and a wide-angle zoom lens having only a few lens elements is achieved.

Next, a description will be given of the proper placement position in an aperture stop 1 so as to achieve a simple wide-angle zoom lens that is compact and inexpensive and yet has high optical performance.

According to the present invention, an aperture stop 1, which regulates the brightness of the zoom lens, is arranged between the first lens group $G_1$ and the second lens group $G_2$ at a fixed position relative to the image surface. If the aperture stop 1 is arranged on the object side of the second lens group $G_2$, which has positive refractive power and is the lens group which moves for zooming, then the distance between the aperture stop 1 and the first lens group $G_1$ which has negative refractive power would be smaller in comparison to placing the aperture stop 1 on the image side of the second lens group $G_2$. Accordingly, the height of the incident light beam of the off-axis luminous flux that enters the first lens group $G_1$ is lowered, thereby making possible the use of a lens element with a small diameter for the first lens group $G_1$. There are benefits if the height of the incident light beam is lowered, namely, the generation of various aberrations such as the lateral color and curvature of field can be reduced, and the number of lens elements required is reduced, making it possible to obtain a high performance lens having only a few lens elements. Further, by arranging the second lens group $G_2$ on the image-side of the aperture stop 1, the outer diameter of the lens element(s) in the second lens group $G_2$ does not increase. In addition, the off-axis luminous flux that passes through the aperture stop 1 is incident on the second lens group $G_2$ which has a strong positive refractive power, thereby making it possible to constrain the outer diameter of the lens elements of the third lens group $G_3$.

A description of each lens group and of the lens element or elements which form each lens group will now be given.

The first lens group $G_1$ is formed of a negative lens element having different radii of curvature on its opposite sides, with the surface having stronger curvature (i.e., a smaller radius of curvature) on the image side. A negative lens is essential to obtain negative refractive power in the first lens group $G_1$, and it is necessary that at least one lens element in the first lens group $G_1$ have this shape. By having the surface with stronger curvature be concave and on the image side, it is possible to hold to a minimum the generation of coma and curvature of field in the image formed by the off-axis luminous flux that passes through the aperture stop 1, even when the aperture stop 1 is arranged immediately after the first lens group $G_1$. By arranging the spacing of the aperture stop 1 and the first lens group $G_1$ in proximity as described above, it becomes possible to reduce the outer diameter of the first lens group $G_1$.

Since the second lens group $G_2$ has positive refractive power, it is necessary that at least one convex lens element be included in the second lens group $G_2$. From among the lens element surfaces of the second lens group $G_2$, it is necessary that the surface nearest the object side have a convex surface with strong curvature in order to cancel the strong dispersion action caused by the negative refractive power of the first lens group $G_1$. According to the present embodiment, since the magnification of image by the second lens group $G_2$ is not large, fluctuation in aberrations occurring when there is zooming is not large compared to the amount of refractive power. Hence it becomes possible to construct this group with a minimum number of lens elements. In this case, the second lens group $G_2$ must disperse the strong positive refractive power in the front and rear of the lens so as to favorably correct the spherical aberration and the curvature of field that occur over the entire range of zoom, since the aperture stop 1 is distant at the wide-angle end and nearby at the telephoto end. Accordingly, in order to minimize the number of lens elements, the use of a bi-convex lens is preferred.

Further, if aspherical lenses are used in each of the first lens group $G_1$ and the second lens group $G_2$, then the number of lens elements can be reduced.

In other words, by making at least one surface of the negative lens element in the first lens group $G_1$ aspherical, it becomes possible to favorably correct various aberrations such as distortion and curvature of field over the entire range of zoom, even when the first lens group $G_1$ consists of only a single negative lens element. Furthermore, by making at least one surface of the bi-convex lens element in the second lens group $G_2$ aspherical, it becomes possible to create a wide-angle zoom lens having high optical performance, even when the second lens group $G_2$ consists only of a single lens element.

In addition, by forming the aspherical negative lens element of the first lens group $G_1$ and the aspherical positive lens element of the second lens group $G_2$ from an organic material or materials, it becomes possible for the simple wide-angle zoom lens according to the present invention to maintain favorable imaging performance and to reduce variations in focus resulting from changes in temperature and humidity, even when each lens group consists of only a single lens element. The fact that costs can be reduced significantly by making the lens elements from an organic material or materials is a significant benefit.

The third lens group $G_3$, which has positive refractive power, is made to be achromatic by cementing together a positive lens element and a negative lens element. This favorably reduces the chromatic aberrations over the entire rang of zoom. Since the third lens group $G_3$, just as the second lens group $G_2$, has only a small magnification affect on the image, the aberration fluctuation which occurs when there is zooming is also not large compared to the amount of the refractive power. Hence, the number of lens elements can be reduced. When the third lens group $G_3$ consists of only two lens elements (this is the minimum number of lens elements, with one being of positive refracting power and one of negative refracting power), each must have unusually strong refractive power in order to achieve achromatism. When arranging two separate lenses which have unusually strong refractive powers, there is significant performance deterioration due to the generation of large spherical aberration. However, if these lens elements are cemented together, then the generation of spherical aberration can be constrained so as to achieve a favorable performance.

Moreover, it becomes possible to provide a quality image, suitable for the zoom lens to be used with a camera, more specifically, in an electronic still camera, when a problem with shading and so forth rarely occurs, even when using an image sensor such as a CCD array. This is because the second lens group $G_2$ and the third lens group have positive refractive power, causing the image to be nearly telecentric at both the wide-angle end and at the telephoto end.

When falling below the value of the lower limit of Condition (1), the negative refraction power of the first lens group $G_1$ weakens and, in order to maintain the prescribed zoom ratio, the movement amount of the second lens group $G_2$ becomes too great, thereby increasing the size of the zoom lens. Hence the compactness is lost. Further, since the spacing between the first lens group $G_1$ and the aperture stop 1 increases, the larger outer diameter required of the first lens group $G_1$ also makes the zoom lens larger. Conversely, when exceeding the value of the upper limit, each of the negative and positive refractive powers of the first lens group $G_1$ and the second lens group $G_2$, respectively, becomes too large, making it impossible to maintain balanced correction of aberrations over the entire range of zoom.

When falling below the value of the lower limit of Condition (2), the positive refractive power of the second lens group $G_2$ becomes too great, making it impossible to favorably correct various aberrations, such as spherical aberration and curvature of field, over the entire range of zoom. When exceeding the value of the upper limit, the power of the second lens group $G_2$ becomes insufficient to cancel the negative refractive power of the first lens group $G_1$, thereby making it necessary to increase the positive refractive power of the third lens group $G_3$. In such a case, it becomes necessary to increase the number of lens elements of the third lens group $G_3$ in order to reduce spherical aberration and so forth. Thus the total length of the zoom lens increases, which causes compactness of the zoom lens to be lost.

Condition (3) regulates the positional relationship between the first lens group $G_1$ (which has negative refractive power) and the aperture stop 1 so as to limit the overall length of the zoom lens as well as the outer diameter thereof. When falling below the lower limit, the back focus of the zoom lens becomes too small, making the space insufficient for an image sensor, such as a CCD. When the distance between the aperture stop 1 and the second lens group $G_2$ is made larger relative to the distance between the first lens group $G_1$ and the aperture stop 1 in order to avoid this problem, another problem is generated in that the outer diameter of the second lens group $G_2$ becomes larger. When exceeding the value of the upper limit, the aperture stop 1 becomes too remote from the first lens group $G_1$, requiring the outer diameter of the first lens group $G_1$ to be too large. Hence the back focus of the zoom lens becomes too large, which causes the compactness of the zoom lens to be lost.

Condition (4) also regulates the overall length of the zoom lens as well as the outer diameter thereof. When falling below the value of the lower limit, the movement amount of the second lens group $G_2$, becomes too small, mainly when there is zooming power, making the desired zoom ratio unobtainable, and the refractive power of the second lens group $G_2$ becomes too large, making it no longer possible to achieve a high-quality image. When exceeding the value of the upper limit, compactness is lost with the larger scale of the zoom lens.

Moreover, in the present embodiment, a ¼" diameter CCD array is used as the solid-state image sensor, and an IR cut-off filter is used as the filter component 2 between the zoom lens and the image sensor. However, a thicker low pass filter may also be used with almost no effect on performance.

Embodiment 1

FIG. 1 shows the basic lens element construction of the simple wide-angle zoom lens of Embodiment 1, indicating the lens group positions at the wide-angle end. As described above, the simple wide-angle zoom lens of Embodiment 1 is composed of, in order form the object side, a first lens group $G_1$ having negative refractive power, a second lens group $G_2$ having positive refractive power, and a third lens group $G_3$ having positive refractive power, wherein, when there is zooming, the first lens group $G_1$ remains in a fixed state while the prescribed focal length is changed by the movement of the second lens group $G_2$ and the third lens group $G_3$.

The first lens group $G_1$ may consist of a single first lens element $L_1$, which is a negative meniscus lens element with its convex surface on the object side. The second lens group $G_2$ may consist of a single second lens element $L_2$ which is a bi-convex lens having surfaces of different radii of curvature on its opposite sides, with the side having the greature curvature on the image side. The third lens group $G_3$ may be composed of a third lens element $L_3$ (which is a bi-convex lens having different radii of curvature on its opposite sides, with the side having the greater curvature on the image side) and a fourth lens element $L_4$ which is a negative meniscus lens element with its convex surface on the image side.

Moreover, the first lens element $L_1$ and the second lens element $L_2$ are formed from organic material.

Table 1 shows the surface number #, in order from the object side, the radius of curvature R (in mm) of each lens element surface, the on-axis surface spacing D (in mm), as well as the refractive index $N_d$, and the Abbe constant $v_d$ (for the sodium d-line) of each lens element of Embodiment 1. The distance $D_e$ (in mm) along the optical axis from the surface of $R_2$ to the aperture stop 1 is also indicated. Those surface numbers # having a * to the right side of the surface number are aspherical, and have a surface shape expressed by the following equation.

$$Z=Ch^2/\{1+(1-KC^2h^2)^{1/2}\}+A_4h^4+A_6h^6+A_8h^8+A_{10}h^{10} \quad \text{(Equation A)}$$

where

Z is the length (in mm) of a line drawn from a point on the aspherical surface at height h from the optical axis to the tangential plane of the aspherical surface vertex, $C(=1/R)$ is the curvature of the aspherical surface near the optical axis, h is the height (in mm) from the optical axis, K is the eccentricity, and $A_4$, $A_6$, $A_8$, and $A_{10}$ are the 4th, 6th, 8th, and 10th aspherical coefficients.

Further, at the bottom of Table 1, the values for each of the constants K and $A_4$–$A_{10}$ in the equation for the aspherical surfaces are indicated.

Table 2, below, indicates various values at the wide-angle end, the mid-position, and the telephoto end of the simple wide-angle zoom lens of the present embodiment.

TABLE 2

|  | WIDE | MID | TELE |
|---|---|---|---|
| f | 2.876 | 4.565 | 5.316 |
| $F_{NO}$ | 2.88 | 4.57 | 5.32 |
| ω | 34.8° | 23.7° | 20.6° |
| $D_2$ | 13.0662 | 8.9158 | 7.6056 |

TABLE 2-continued

| $D_4$ | 1.3312 | 5.8626 | 6.8048 |
|---|---|---|---|
| Bf | 2.5839 | 2.2158 | 2.5976 |

Conditions:

(1) $f_1/f_w = -2.32$
(2) $f_2/f_w = 3.05$
(3) $D_e/f_w = 2.39$
(4) $D_{2w}/f_w = 4.55$

Figure 2:
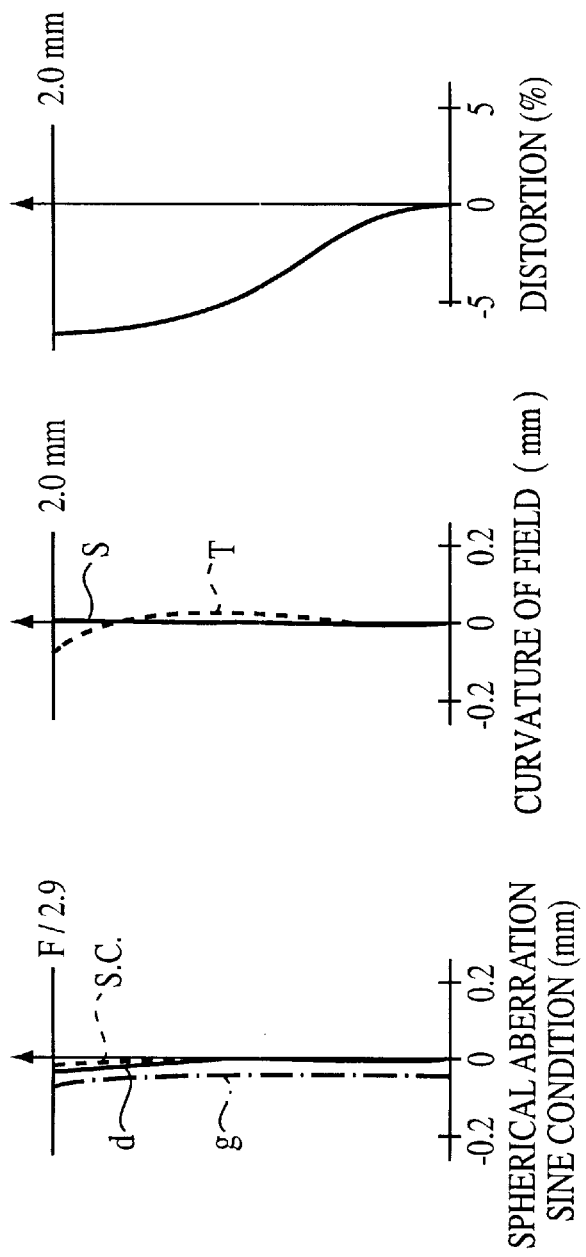
FIGS. 2, 3 and 4 each illustrate the spherical aberration, curvature of field, and distortion of the wide-angle zoom lens of Embodiment 1 at the wide-angle end, the mid-position, and telephoto end, respectively.
Figure 3:
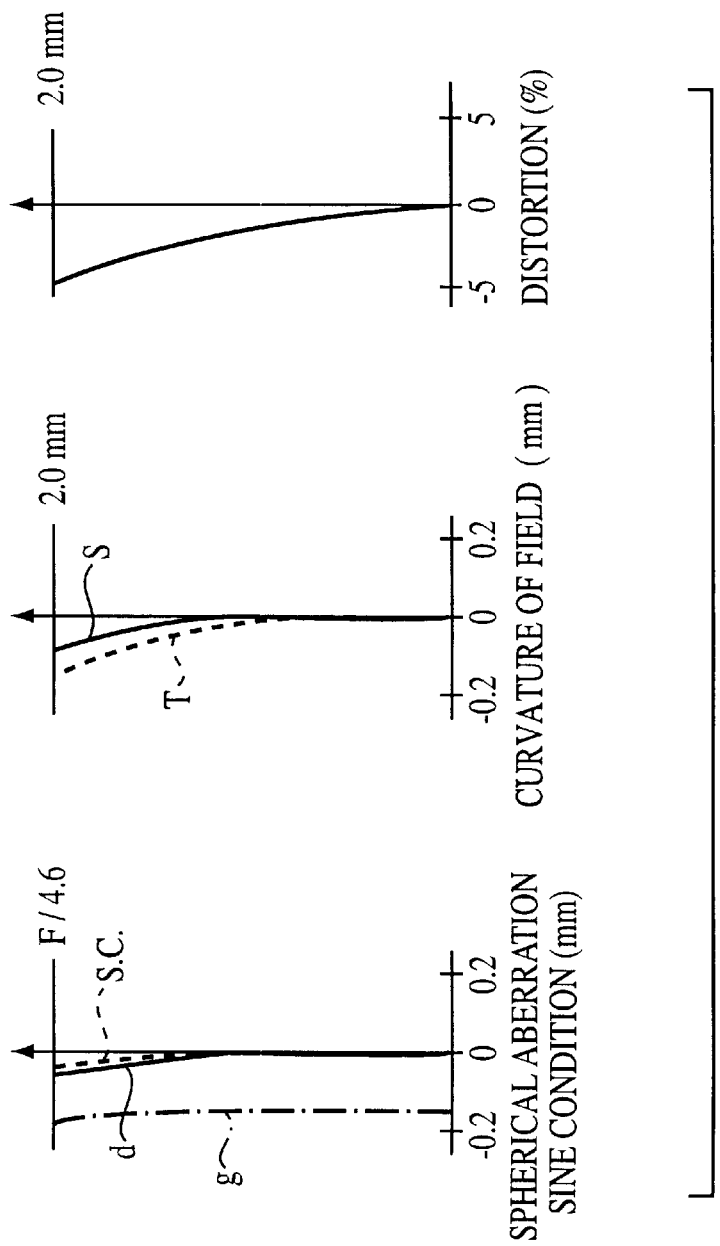
Figure 4:
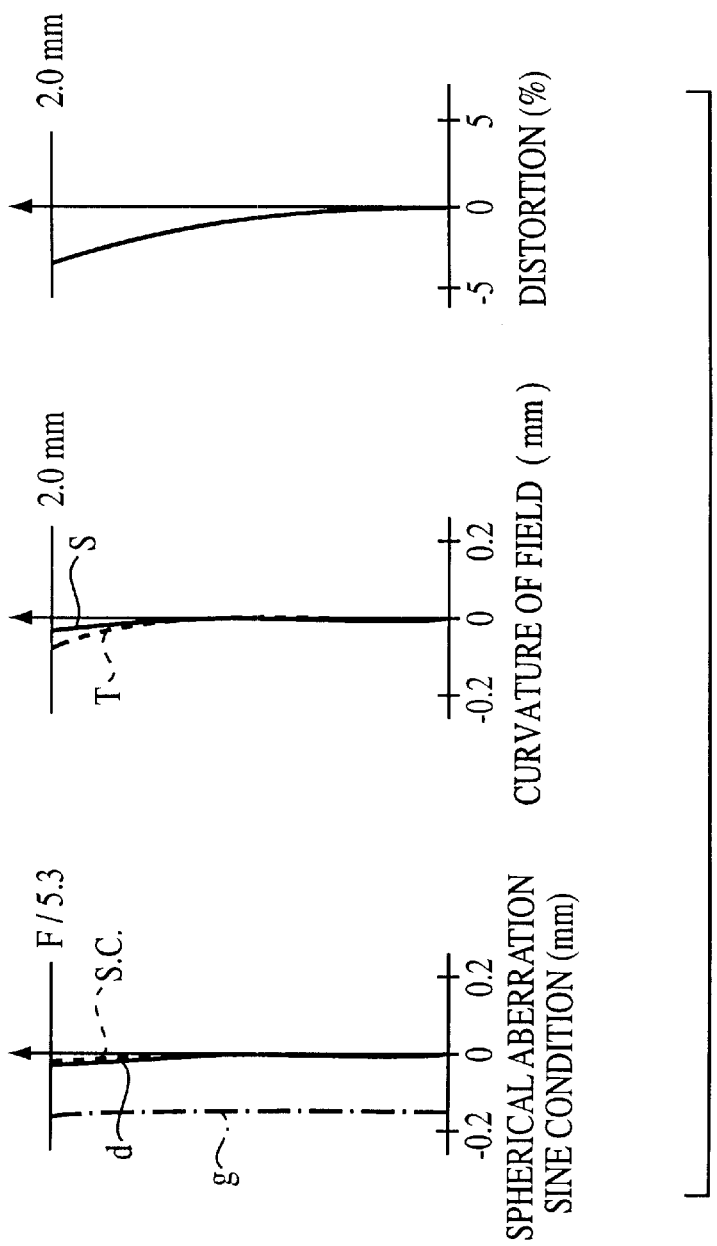

FIGS. 2–4 illustrate the spherical aberration, curvature of field, and distortion of the simple wide-angle zoom lens of Embodiment 1 at the wide-angle end, the mid-position, and the telephoto end, respectively. In FIGS. 2–4, S.C. indicates the sine condition, S indicates the curvature of field of the sagittal ray focus, and T indicates the curvature of field of the tangential ray focus.

As is shown in Table 2 as well as in FIGS. 2 through 4, Embodiment 1 satisfies all of the Conditions (1) through (4) with the $F_{NO}$ of wide-angle zoom lens being 2.88–5.32, and the focal length f being 2.876–5.316 mm. Further, it is evident that this embodiment provides a simple, high performance, wide-angle zoom lens that favorably corrects each aberration.

Embodiment 2

Figure 5:
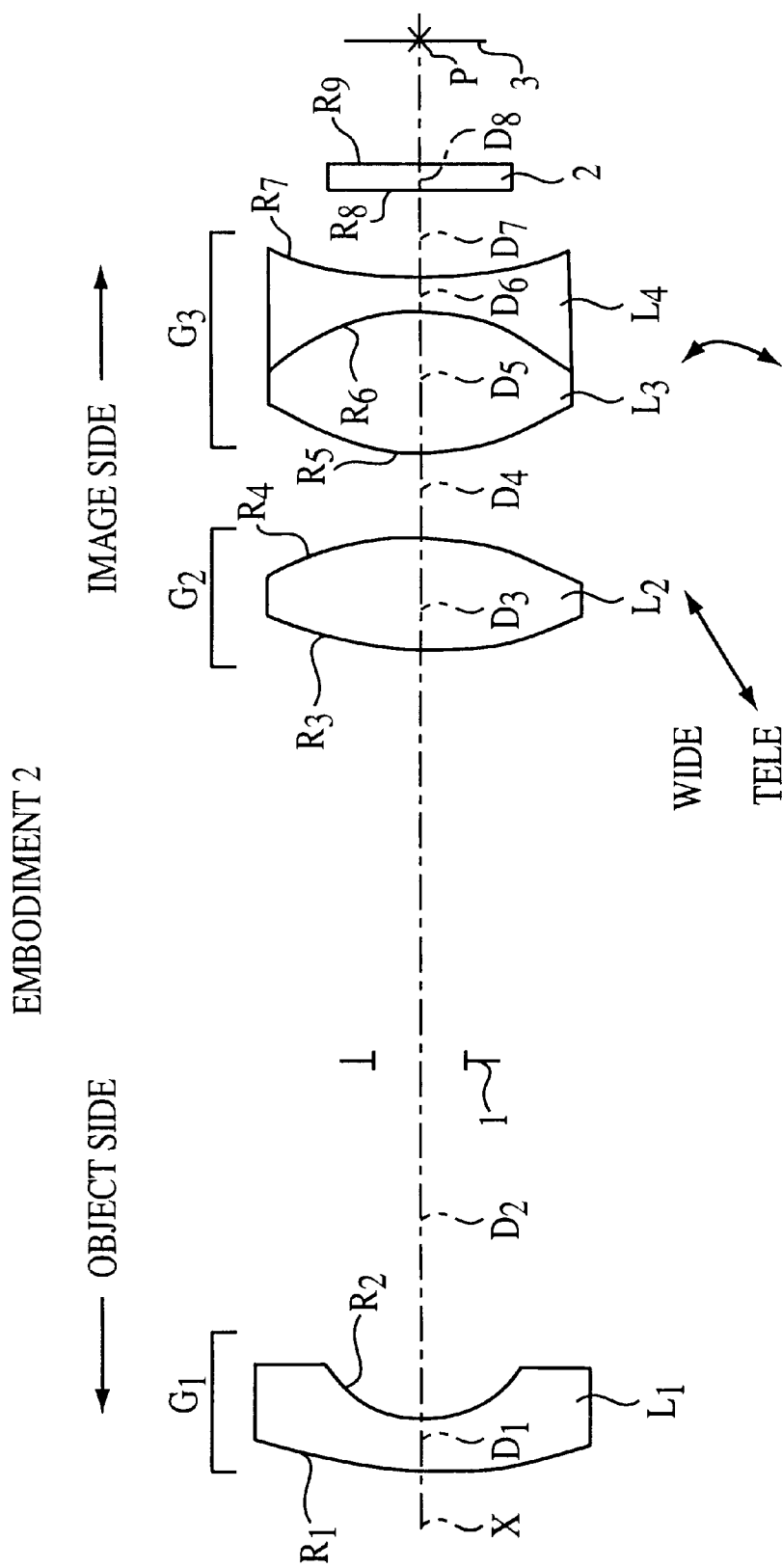
FIG. 5 illustrates the basic lens element construction of the wide-angle zoom lens of Embodiment 2.

FIG. 5 illustrates the basic lens element construction of Embodiment 2, with the lens group positions at the wide-angle end being shown. The basic lens element construction of Embodiment 2 is about the same as in Embodiment 1, except that the third lens group $G_3$ is formed of a cemented pair of lens elements. A third lens element $L_3$, consisting of a bi-convex lens having different radii of curvature on its opposite sides with the surface of greater curvature on the

TABLE 1

| # | R | D | $N_d$ | $v_d$ |
|---|---|---|---|---|
| 1* | 34.9297 | 1.2000 | 1.49023 | 57.6 |
| 2 | 2.9621 | variable, $D_2$ | | |
| 3* | 8.2617 | 2.7187 | 1.49023 | 57.6 |
| 4 | -8.0046 | variable, $D_4$ | | |
| 5 | 8.0488 | 3.0000 | 1.62299 | 58.1 |
| 6 | -4.4082 | 0.9375 | 1.84667 | 23.8 |
| 7 | -39.2988 | 2.0000 | | |
| 8 | ∞ | 0.5500 | 1.51633 | 64.1 |
| 9 | ∞ | | | |
|  | $D_e$ = 6.8692 | | | |

| # | C | K | $A_4$ | $A_6$ | $A_8$ | $A_{10}$ |
|---|---|---|---|---|---|---|
| 1 | 0.0286289 | 2.519965 | $7.6154 \times 10^{-4}$ | $2.5363 \times 10^{-5}$ | $7.9919 \times 10^{-9}$ | $1.7300 \times 10^{-12}$ |
| 3 | 0.1210405 | -4.939529 | $7.2800 \times 10^{-4}$ | $-5.504 \times 10^{-6}$ | $-4.9095 \times 10^{-8}$ | $-2.2100 \times 10^{-11}$ | image side, is cemented to a fourth lens element $L_4$. The fourth lens element consists of a bi-concave lens having different radii of curvature on its opposite sides, with the surface of greater curvature on the object side.

Table 3 shows the surface number #, in order from the object side, the radius of curvature R (in mm) of each lens element surface, the on-axis surface spacing D (in mm), as well as the refractive index $N_d$, and the Abbe constant $v_d$ (for the sodium d-line) of each lens element of Embodiment 2. The distance $D_e$ (in mm) along the optical axis from the surface of $R_2$ to the aperture stop 1 is also indicated. Those surface numbers # having a * to the right side of the surface number are aspherical, and have a surface shape expressed by Equation (A) above. Further, at the bottom of Table 3, the values for each of the constants K and $A_4$ through $A_{10}$ in the equation for the surfaces indicated as aspherical are given.

TABLE 3

| # | R | D | $N_d$ | $v_d$ |
|---|---|---|---|---|
| 1* | 12.6485 | 1.2000 | 1.49023 | 57.6 |
| 2* | 2.5308 | variable, $D_2$ | | |
| 3* | 10.7056 | 2.7187 | 1.49023 | 57.6 |
| 4 | −8.6626 | variable, $D_4$ | | |
| 5 | 6.4854 | 3.4000 | 1.62299 | 58.1 |
| 6 | −6.1834 | 0.9500 | 1.84667 | 23.8 |
| 7 | 12.7245 | 2.0000 | | |
| 8 | ∞ | 0.5500 | 1.51633 | 64.1 |
| 9 | ∞ | | | |
| | $D_e$ = 8.4848 | | | |

| # | C | K | $A_4$ | $A_6$ | $A_8$ | $A_{10}$ |
|---|---|---|---|---|---|---|
| 1 | 0.0790608 | 1.699242 | $-6.2188 \times 10^{-3}$ | $6.0058 \times 10^{-4}$ | $-1.9298 \times 10^{-5}$ | $2.5020 \times 10^{-7}$ |
| 2 | 0.3951320 | 0.659513 | $-9.3008 \times 10^{-3}$ | 0.0 | $3.2687 \times 10^{-5}$ | $8.4709 \times 10^{-6}$ |
| 3 | 0.0934091 | −4.939529 | $-1.0246 \times 10^{-4}$ | $5.4772 \times 10^{-5}$ | $-4.0461 \times 10^{-6}$ | $9.4945 \times 10^{-8}$ |

Table 4, below, indicates various values at the wide-angle end, the mid-position, and the telephoto end of the simple wide-angle zoom lens of the present embodiment.

TABLE 4

| | WIDE | MID | TELE |
|---|---|---|---|
| f | 2.900 | 5.727 | 7.100 |
| $F_{NO}$ | 2.90 | 5.73 | 7.10 |
| ω | 34.6° | 19.3° | 15.7° |
| $D_2$ | 18.6987 | 11.0862 | 9.2211 |
| $D_4$ | 1.9525 | 11.0796 | 11.4282 |
| $B_f$ | 3.0647 | 1.5491 | 3.0656 |

Conditions:

(1) $f_1/f_w$ = −2.32
(2) $f_2/f_w$ = 3.53
(3) $D_e/f_w$ = 2.93
(4) $D_{2w}/f_w$ = 6.45

Figure 6:
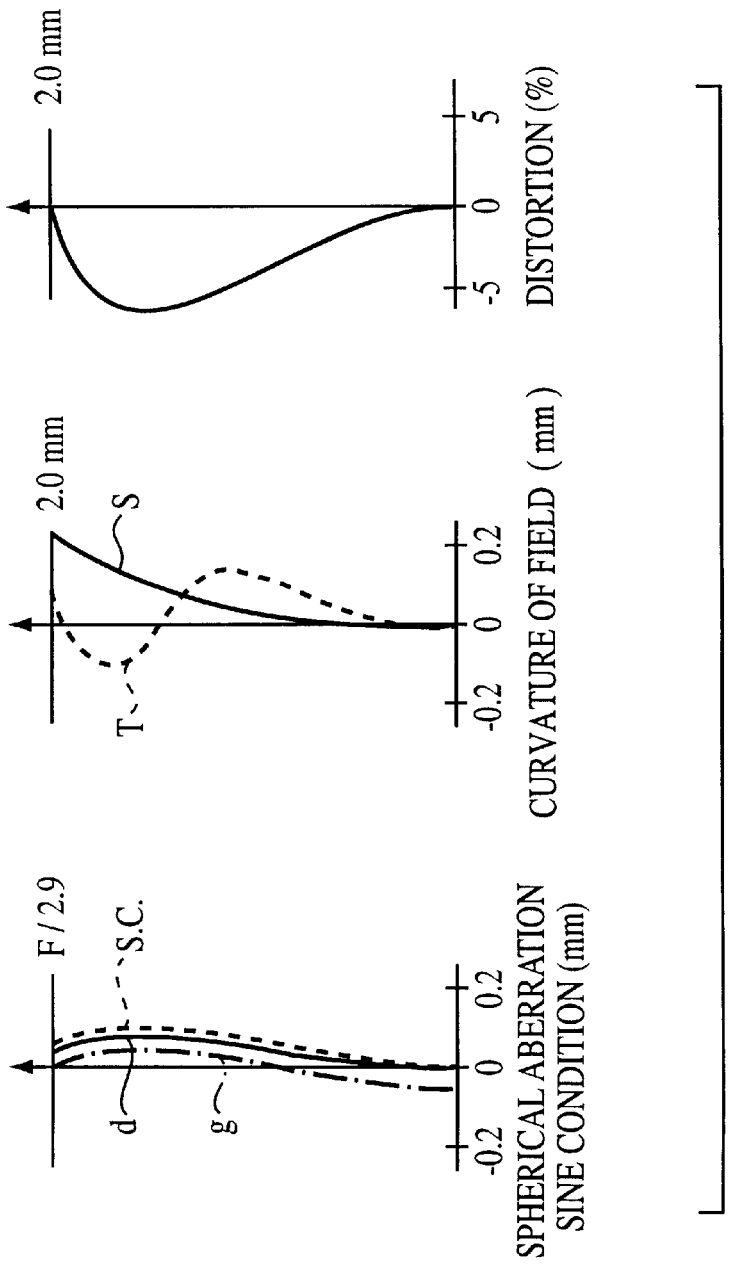
FIGS. 6, 7 and 8 each illustrate the spherical aberration, curvature of field and distortion of the wide-angle zoom lens of Embodiment 2 at the wide-angle end, the mid-position, and the telephoto end, respectively.
Figure 7:
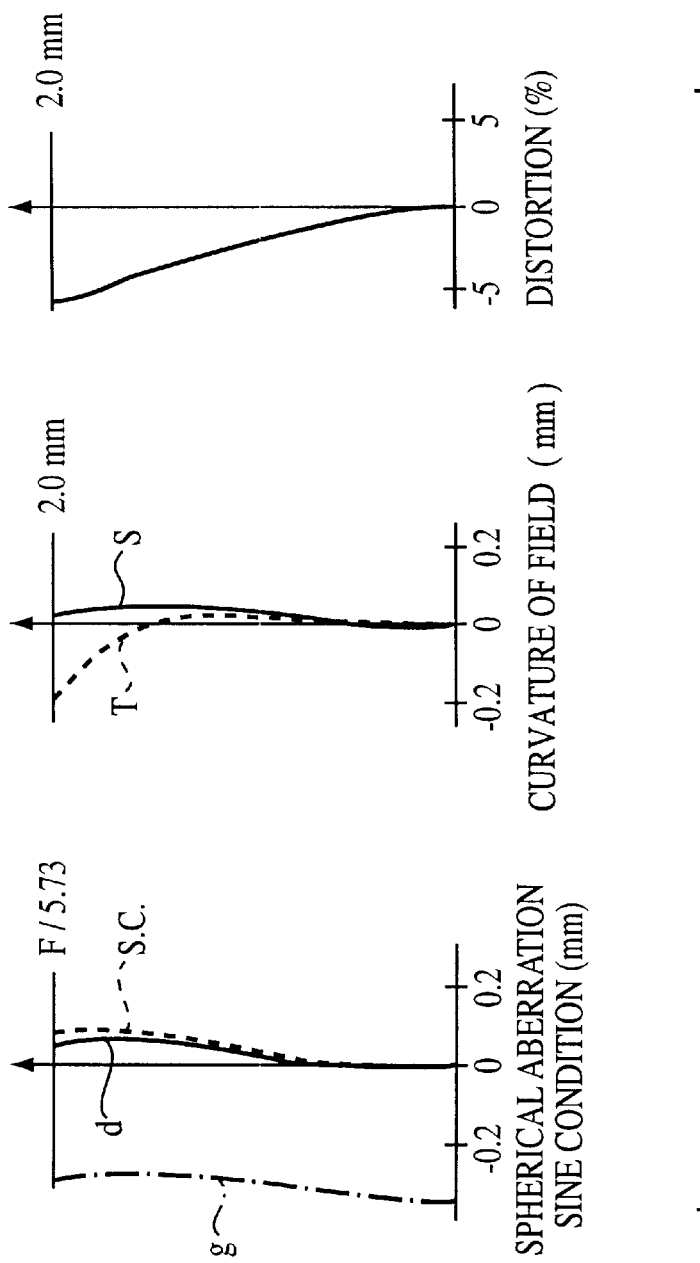
Figure 8:
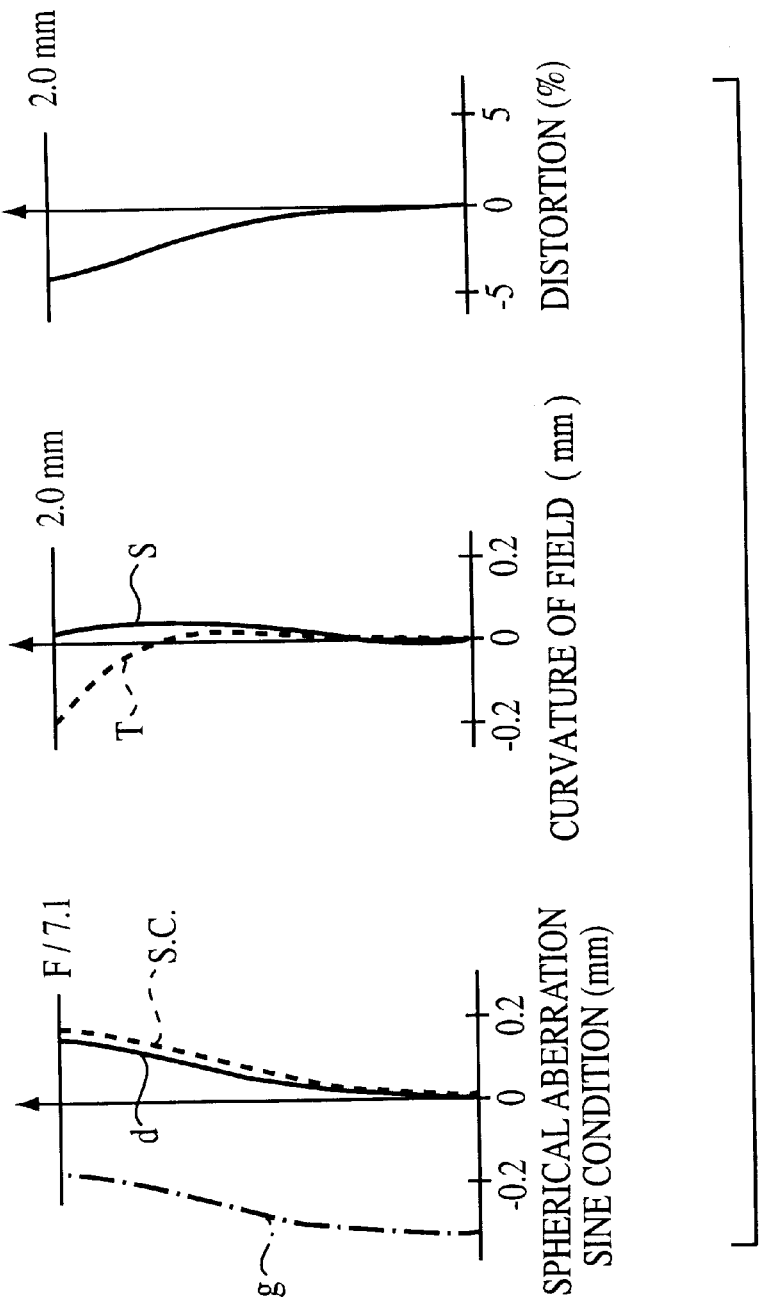

FIGS. 6 through 8 illustrate the spherical aberration, curvature of field, and distortion of the simple wide-angle zoom lens of Embodiment 2 at the wide-angle end, the mid-position, and at the telephoto end, respectively. In FIGS. 6–8, S.C. indicates the sine condition, S indicates the curvature of field of the sagittal ray focus, and T indicates the curvature of field of the tagential ray focus.

As is shown in Table 4 as well as in FIGS. 6 through 8, Embodiment 2 satisfies all of the Conditions (1) through (4) with the $F_{NO}$ of the zoom lens being 2.90–7.10, and the focal length f being 2.900–7.100 mm. Further, it is evident that this embodiment provides a simple, high performance, wide-angle zoom lens that favorably corrects each aberration.

Embodiment 3

Figure 9:
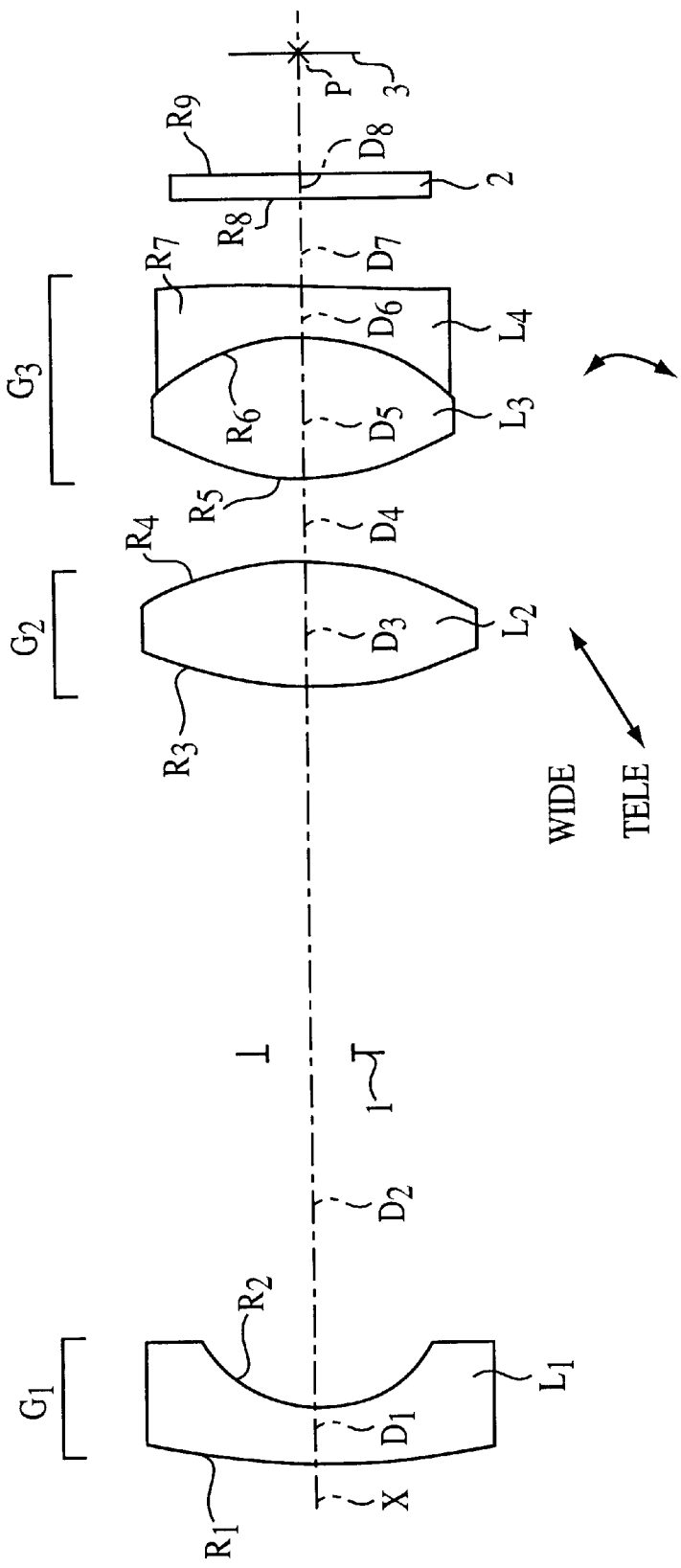
FIG. 9 illustrates the basic lens element construction of the wide-angle zoom lens of Embodiment 3; and, FIGS. 10, 11 and 12 each illustrate the spherical aberration, curvature of field and distortion of the wide-angle zoom lens of Embodiment 3 at the wide-angle end, the mid-position, and the telephoto end, respectively.

FIG. 9 illustrates the basic lens element construction of Embodiment 3, with the lens group 3 is nearly the same as in Embodiment 1.

Table 5 shows the surface number #, in order from the object side, the radius of curvature R (in mm) of each lens element surface, the on-axis surface spacing D (in mm), as well as the refractive index $N_d$, and the Abbe constant $v_d$ (for the sodium d-line) of each lens element of Embodiment 3. The distance $D_e$ (in mm) along the optical axis from the surface of $R_2$ to the aperture stop 1 is also indicated. Those surface numbers # having a * to the right side of the surface number are aspherical, and have a surface shape expressed by Equation (A) above. Further, at the bottom of Table 5, the values for each of the constants K and $A_4$ through $A_{10}$ in the equation for the surfaces indicated as aspherical are given.

TABLE 5

| # | R | D | $N_d$ | $v_d$ |
|---|---|---|---|---|
| 1* | 38.795 | 1.2000 | 1.49023 | 57.6 |
| 2 | 3.3527 | variable, $D_2$ | | |
| 3* | 9.5827 | 2.7187 | 1.49023 | 57.6 |
| 4 | −8.8750 | variable, $D_4$ | | |
| 5 | 7.1408 | 3.0000 | 1.62299 | 58.1 |
| 6 | −5.2573 | 0.9375 | 1.84667 | 23.8 |
| 7 | −224.7320 | 2.0000 | | |
| 8 | ∞ | 0.5500 | 1.51633 | 64.1 |
| 9 | ∞ | | | |
| | $D_e$ = 7.7370 | | | |

| # | C | K | $A_4$ | $A_6$ | $A_8$ | $A_{10}$ |
|---|---|---|---|---|---|---|
| 1 | 0.0257782 | 42.42987 | $4.8703 \times 10^{-4}$ | $2.5363 \times 10^{-5}$ | $-3.0906 \times 10^{-7}$ | $4.5430 \times 10^{-10}$ |
| 3 | 0.1043547 | −4.93953 | $8.2217 \times 10^{-5}$ | $7.7353 \times 10^{-5}$ | $-6.5852 \times 10^{-6}$ | $-1.8539 \times 10^{-7}$ |

Table 6, below, indicates various values at the wide-angle end, the mid-position, and the telephoto end of the simple wide-angle zoom lens of the present embodiment.

TABLE 6

|  | WIDE | MID | TELE |
|---|---|---|---|
| f | 2.901 | 4.938 | 5.903 |
| $F_{NO}$ | 2.90 | 4.94 | 5.90 |
| ω | 34.6° | 22.1° | 18.7° |
| $D_2$ | 15.4680 | 10.0720 | 8.3036 |
| $D_4$ | 1.9525 | 7.8448 | 9.1097 |
| Bf | 2.5124 | 2.0161 | 2.5196 |

Conditions:

(1) $f_1/f_w$ = −2.61
(2) $f_2/f_w$ = 3.41
(3) $D_e/f_w$ = 2.67
(4) $D_{2w}/f_w$ = 5.33

Figure 10:
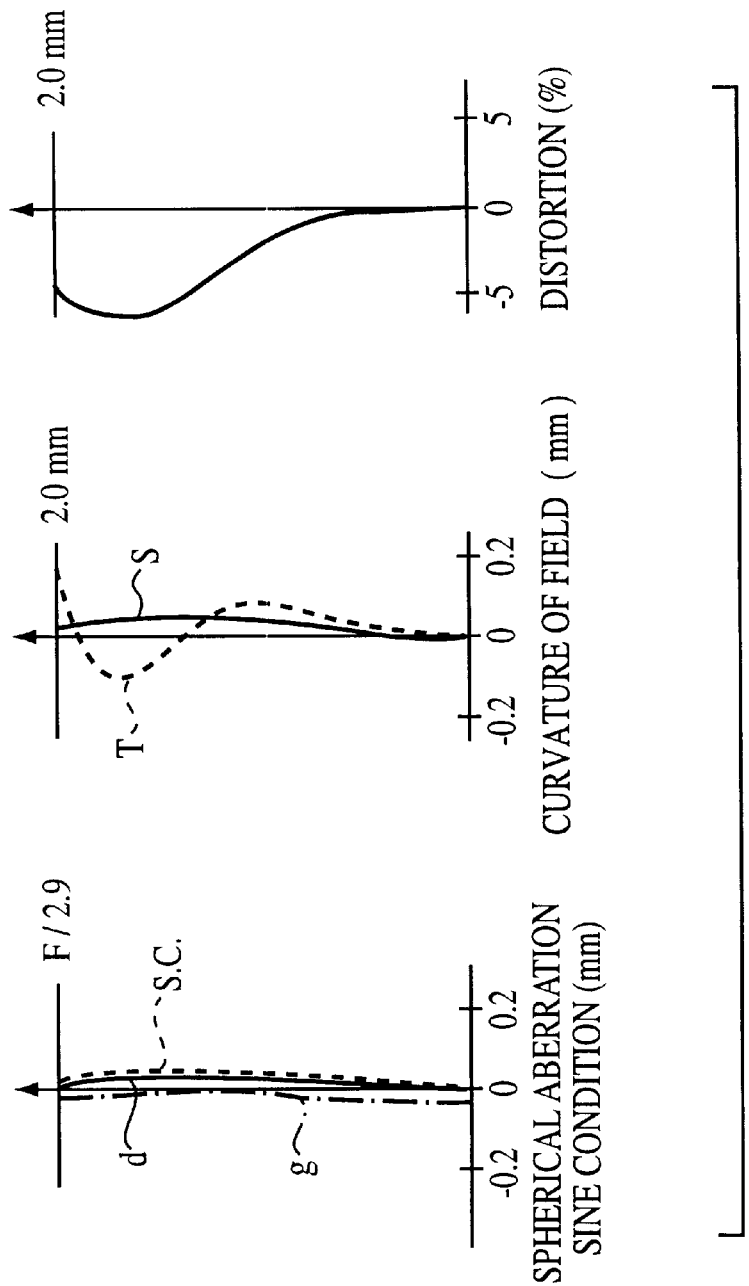
Figure 11:
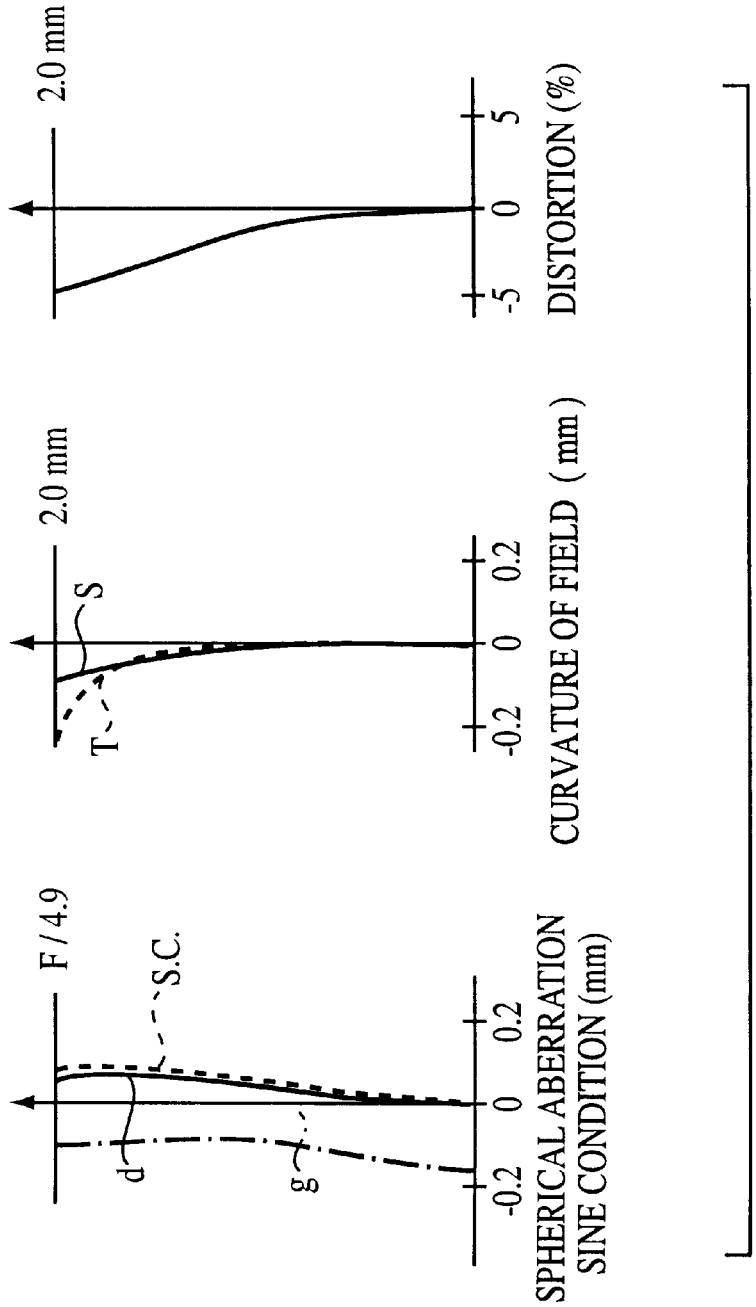
Figure 12:
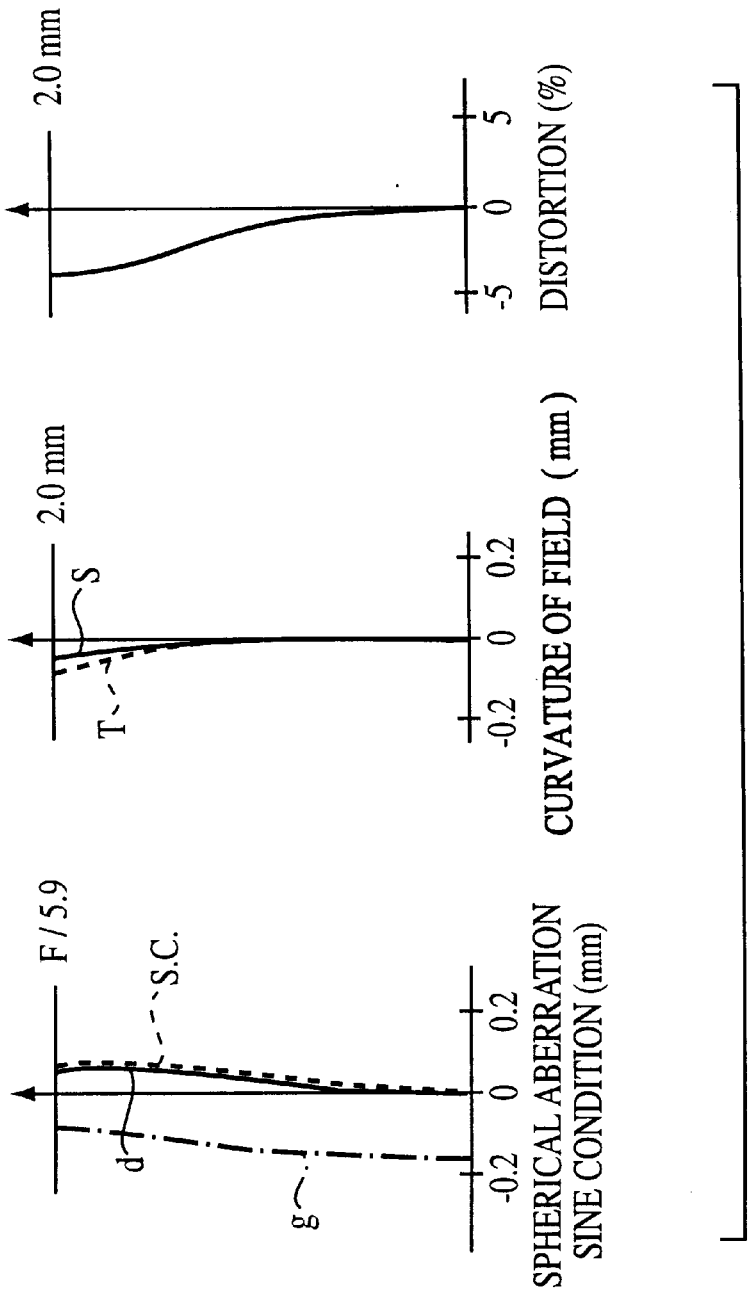

FIGS. 10–12 illustrate the spherical aberration, curvature of field, and distortion of the simple wide-angle zoom lens that relates to Embodiment 3 at the wide-angle end, the mid-position, and the telephoto end, respectively. In FIGS. 10–12, S.C. indicates the sine condition, S indicates the curvature of field of the sagittal ray focus, and T indicates the curvature of field of the tangential ray focus.

As is shown in Table 6 as well as in FIGS. 10 through 12, Embodiment 3 satisfies all of the Conditions (1) through (4) with the $F_{NO}$ of the zoom lens being 2.90–5.90, and the focal length f being 2.901–5.903 mm. Further, it is evident that this embodiment provides a simple, high performance, wide-angle zoom lens that favorably corrects each aberration.

As described above, according to the present invention, it is possible to obtain a simple, compact, high performance wide-angle zoom lens that reduces the lens diameter of the first lens be used in an electronic still camera. Further, in addition to reducing the number of lens elements, costs are reduced by employing lens elements formed of an organic material.

The invention being thus described, it will be obvious that the same may be varied in many ways. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. A wide-angle lens comprising, in order from the object side, a first lens group of negative refractive power having a concave lens element surface on the image side, a second lens group of positive refractive power and including a biconvex lens element, and a third lens group of positive refractive power, side wide-angle zoom lens including only three lens groups and only four lens elements.

2. A wide-angle zoom lens of claim 1, and further comprising a stop positioned between the first lens group and the second lens group.

3. A wide-angle zoom lens of claim 1, wherein the first and second lens groups each consist of a single lens element, and the third lens group is composed of a third lens element and fourth lens element that are cemented together.

4. A wide-angle zoom lens of claim 3, wherein the third lens element is of positive refractive power and the fourth lens element is of negative refractive power.

5. The wide-angle zoom lens according to claim 1, said lens further having the following construction:

| # | R | D | $N_d$ | $v_d$ |
|---|---|---|---|---|
| 1 | 34.9297 | 1.2000 | 1.49023 | 57.6 |
| 2 | 2.9621 | variable, $D_2$ | | |
| 3 | 8.2617 | 2.7187 | 1.49023 | 57.6 |
| 4 | −8.0046 | variable, $D_4$ | | |
| 5 | 8.0488 | 3.0000 | 1.62299 | 58.1 |
| 6 | −4.4082 | 0.9375 | 1.84667 | 23.8 |
| 7 | −39.2988 | 2.0000 | | |
| 8 | ∞ | 0.5500 | 1.51633 | 64.1 |
| 9 | ∞ | | | | where # is the surface number in order from the object side, R is the radius of curvature in mm of each lens element surface near the optical axis, D is the on-axis surface in mm, $N_d$ is the refractive index, and $v_d$ the Abbe constant (for the sodium d-line) of each lens element, $D_2$ is in the range 13.0662–7.6056 and $D_4$ is in the range 1.3312–6.8048.

6. The wide-angle zoom lens according to claim 1, said lens further having the following construction:

| # | R | D | $N_d$ | $v_d$ |
|---|---|---|---|---|
| 1 | 12.6485 | 1.2000 | 1.49023 | 57.6 |
| 2 | 2.5308 | variable, $D_2$ | | |
| 3 | 10.7056 | 2.7187 | 1.49023 | 57.6 |
| 4 | −8.6626 | variable, $D_4$ | | |
| 5 | 6.4854 | 3.4000 | 1.62299 | 58.1 |
| 6 | −6.1834 | 0.9500 | 1.84667 | 23.8 |
| 7 | 12.7245 | 2.0000 | | |
| 8 | ∞ | 0.5500 | 1.51633 | 64.1 |
| 9 | ∞ | | | | where # is the surface number in order from the object side, R is the radius of curvature in mm of each lens element surface near the optical axis, D is the on-axis surface spacing in mm, $N_d$ is the refractive index, and $v_d$ the Abbe constant (for the sodium d-line) of each lens element, $D_2$ is in the range 18.6987–9.2211, and $D_4$ is in the range 1.9525–11.4282.

7. The wide-angle zoom lens according to claim 1, said lens further having the following construction:

| # | R | D | $N_d$ | $v_d$ |
|---|---|---|---|---|
| 1 | 38.7925 | 1.2000 | 1.49023 | 57.6 |
| 2 | 3.3527 | variable, $D_2$ | | |
| 3 | 9.5827 | 2.7187 | 1.49023 | 57.6 |
| 4 | −8.8750 | variable, $D_4$ | | |
| 5 | 7.1408 | 3.0000 | 1.62299 | 58.1 |
| 6 | −5.2573 | 0.9375 | 1.84667 | 23.8 |
| 7 | −224.7320 | 2.0000 | | |
| 8 | ∞ | 0.5500 | 1.51633 | 64.1 |
| 9 | ∞ | | | | where # is the surface number in order from the object side, R is the radius of curvature in mm of each lens element surface near the optical axis, D is the on-axis surface spacing in mm, $N_d$ is the refractive index and $v_d$ the Abbe constant (for the sodium d-line) of each lens element, $D_2$ is in the range 15.4680–8.3036, and $D_4$ is in the range 1.9525–9.1097.

8. A wide-angle zoom lens comprising, in order from the object side:
a first lens group having negative refractive power, said first lens group including a negative lens element with a concave surface on the image side;

a second lens group having positive refractive power, said second lens group including a bi-convex lens; and a third lens group having positive refractive power;

wherein, when zooming, said second lens group and said third lens group move along the optical axis of said wide-angle zoom lens, and the following conditions are satisfied $$-3.0 < f_1/f_w < -2.0$$

$$2.5 < f_2/f_w < 4.0$$

where $f_w$ is the focal length of the wide-angle zoom lens at the wide-angle end, $f_1$ is the focal length of the first lens group, and $f_2$ is the focal length of the second lens group.

9. A wide-angle zoom lens according to claim 8, and further comprising: an aperture stop positioned in a fixed position relative to the image and on the image-side of the first lens group, said wide-angle zoom lens also satisfying the following conditions $$1.9 < D_e/f_w < 3.3$$

$$3.8 < D_{2w}/f_w < 7.7$$

where $D_e$ is the distance on the optical axis from the lens surface positioned at the extreme image-side of the first lens group to the aperture stop, $f_w$ is the focal length of the wide-angle zoom lens at the wide-angle end, and $D_{2w}$ is the spacing between the first lens group and the second lens group at the wide-angle end.

10. A wide-angle zoom lens of claim 9, wherein the first lens group is comprised of only the negative lens element with a concave surface on the image side, and at least one surface of the negative lens element is aspherical.

11. The wide-angle zoom lens according to claim 10, wherein at least one lens element of each of the first lens group and the second lens group is made from an organic material.

12. The wide-angle zoom lens according to claim 10, wherein the third lens group consists of a single set of cemented lens elements.

13. A wide-angle zoom lens according to claim 9, wherein the second lens group is comprised of only one bi-convex lens element, with at least one surface thereof being aspherical.

14. The wide-angle zoom lens according to claim 9, wherein the third lens group is composed of a single set of cemented lens elements.

15. A wide-angle zoom lens of claim 8, wherein the first lens group is comprised of only one negative lens element with a concave surface on the image side, and at least one surface of the negative lens element is aspherical.

16. A wide-angle zoom lens according to claim 15, wherein the second lens group is comprised of only one bi-convex lens element having an aspherical surface.

17. The wide-angle zoom lens according to claim 15, wherein at least one lens element of each of the first lens group and the second lens group is made from an organic material.

18. The wide-angle zoom lens according to claim 15, wherein the third lens group is composed of a single set of cemented lens elements.

19. A wide-angle zoom lens of claim 8, wherein the second lens group is comprised of only one bi-convex lens element, with at least one surface thereof being aspherical.

20. The wide-angle zoom lens according to claim 8, wherein the third lens group is composed of a single set of cemented lens elements.

* * * * *

UNITED STATES PATENT AND TRADEMARK OFFICE
CERTIFICATE OF CORRECTION

PATENT NO : 6,040,949
DATED : March 21, 2000
INVENTOR(S) : OHNO

It is certified that error appears in the above-identified patent and that said Letters Patent are hereby corrected as shown below:

At column 1: line 31, change "element" to - - elements - -;
line 35, change "desire" to - - desired - -;
lines 36-37, change "descloses" to - - discloses - -;
line 38, change "a" to - - the - -;
At column 3: line 37, after "through" insert - - the aperture of - -;
line 60, change "in an" to - - of an - -;
At column 5: line 28, change "rang" to - - range - -;
line 54, change "refraction" to - - refractive - -;
In Table 1: change the value for $A_6$ for surface #3 from "-5.504x10$^{-6}$" to - - -5.5042x10$^{-6}$ - -;
In Table 5: change the value for R for surface #1 from "38.795" to - - 38.7925 - -;
In Claim 1, line 1 (i.e., line 49 of column 11), after "wide-angle" insert - - zoom - -;
In Claim 2, line 1 (i.e., line 56 of column 11), change "A" to - - The - -;
In Claim 3, line 1 (i.e., line 59 of column 11), change "A" to - - The - -;
In Claim 4, line 1 (i.e., line 63 of column 11), change "A" to - - The - -;
In Claim 5, line 19 (i.e., line 17 of column 12), after "surface" insert - - spacing - -;
In Claim 9, line 1 (i.e., line 19 of column 13), change "A" to - - The - -;
In Claim 10, line 1 (i.e., line 38 of column 13), change "A" to - - The - -;
In Claim 10, line 2 (i.e., line 39 of column 13), change "the" to - - one - -;
In Claim 13, line 1 (i.e., line 10 of column 14), change "A" to - - The - -;

UNITED STATES PATENT AND TRADEMARK OFFICE
CERTIFICATE OF CORRECTION

PATENT NO. : 6,040,949
DATED : March 21, 2000
INVENTOR(S) : OHNO

It is certified that error appears in the above-indentified patent and that said Letters Patent is hereby corrected as shown below:

In Claim 15, line 1 (i.e., line 18 of column 14), change "A" to -- The -- ;
In Claim 16, line 1 (i.e., line 22 of column 14), change "A" to -- The -- ;
In Claim 19, line 1 (i.e., line 32 of column 14), change "A" to -- The -- .

Signed and Sealed this

Tenth Day of April, 2001

*Attest:*

NICHOLAS P. GODICI

*Attesting Officer*   *Acting Director of the United States Patent and Trademark Office*